United States Patent
Kadaba

(10) Patent No.: US 11,339,547 B2
(45) Date of Patent: *May 24, 2022

(54) AUTOMATED DISPENSING OF TRAVEL PATH APPLICANTS

(71) Applicant: United Parcel Service of America, Inc., Atlanta, GA (US)

(72) Inventor: Nagesh Kadaba, Roswell, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 5 days.

This patent is subject to a terminal disclaimer.

(21) Appl. No.: 17/087,354

(22) Filed: Nov. 2, 2020

(65) Prior Publication Data

US 2021/0047794 A1 Feb. 18, 2021

Related U.S. Application Data

(63) Continuation of application No. 16/120,510, filed on Sep. 4, 2018, now Pat. No. 10,822,758, which is a continuation of application No. 13/285,767, filed on Oct. 31, 2011, now Pat. No. 10,066,353.

(51) Int. Cl.
*E01H 10/00* (2006.01)

(52) U.S. Cl.
CPC ........ *E01H 10/007* (2013.01); *B60Y 2200/10* (2013.01)

(58) Field of Classification Search
CPC .......................... E01H 10/007; B60Y 2200/10
USPC ................................................. 700/239–240
See application file for complete search history.

(56) References Cited

U.S. PATENT DOCUMENTS

| | | | |
|---|---|---|---|
| 2,170,360 A | 8/1939 | Whelan | |
| 2,856,191 A | 10/1958 | Kolb | |
| 4,023,020 A | 5/1977 | Lestradet | |
| 4,161,280 A * | 7/1979 | Kasinskas | E01H 10/007 134/172 |
| 4,301,944 A | 11/1981 | Lestradet | |
| 4,338,666 A | 7/1982 | Suzuki et al. | |
| 4,387,855 A | 6/1983 | Nielsen | |
| 4,842,440 A | 6/1989 | Alguire | |
| 5,186,396 A | 2/1993 | Wise et al. | |
| 5,203,923 A * | 4/1993 | Hartman | B05B 9/06 118/323 |
| 5,348,226 A | 9/1994 | Heiniger et al. | |
| RE35,010 E | 8/1995 | Price | |
| 5,653,389 A | 8/1997 | Henderson et al. | |
| 5,971,294 A | 10/1999 | Thompson et al. | |
| 6,056,374 A | 5/2000 | Hiwatashi | |
| 6,106,434 A | 8/2000 | Ibamoto et al. | |

(Continued)

FOREIGN PATENT DOCUMENTS

| | | |
|---|---|---|
| CN | 2228094 Y | 5/1996 |
| CN | 2763340 Y | 3/2006 |

(Continued)

*Primary Examiner* — Michael Collins
(74) *Attorney, Agent, or Firm* — Shook, Hardy & Bacon L.L.P.

(57) ABSTRACT

Systems, methods, apparatus, and computer program products are provided for dispensing a travel path applicant. For example, a computing entity can monitor the location of a maintenance vehicle and/or its travel path to dispense travel path applicants accordingly.

20 Claims, 6 Drawing Sheets

(56) References Cited

U.S. PATENT DOCUMENTS

| | | | |
|---|---|---|---|
| 6,154,699 A * | 11/2000 | Williams | E01H 10/007 |
| | | | 701/50 |
| 6,166,657 A | 12/2000 | Mann | |
| 6,535,141 B1 | 3/2003 | Doherty | |
| 6,538,578 B1 | 3/2003 | Doherty | |
| 6,738,704 B2 | 5/2004 | Kawasaki | |
| 6,919,821 B1 | 7/2005 | Smith | |
| 6,977,597 B2 | 12/2005 | Doherty | |
| 7,714,705 B2 | 5/2010 | Rennie et al. | |
| 7,839,301 B2 | 11/2010 | Doherty et al. | |
| 8,120,473 B2 | 2/2012 | Rennie et al. | |
| 8,275,522 B1 | 9/2012 | Groeneweg et al. | |
| 10,066,353 B2 * | 9/2018 | Kadaba | E01H 10/007 |
| 10,072,388 B2 * | 9/2018 | Kadaba | E01H 10/007 |
| 10,822,758 B2 * | 11/2020 | Kadaba | E01H 10/007 |
| 2004/0195357 A1 | 10/2004 | Doherty et al. | |
| 2005/0204587 A1 | 9/2005 | Kime | |
| 2009/0099737 A1 | 4/2009 | Wendte et al. | |
| 2009/0120339 A1 | 5/2009 | Detweiler et al. | |
| 2009/0151243 A1 | 6/2009 | Detweiler et al. | |
| 2011/0180637 A1 * | 7/2011 | Kline | B01F 3/1221 |
| | | | 239/670 |
| 2013/0110284 A1 | 5/2013 | Kadaba | |
| 2013/0110285 A1 | 5/2013 | Kadaba | |
| 2019/0017238 A1 | 1/2019 | Kadaba | |

FOREIGN PATENT DOCUMENTS

| | | |
|---|---|---|
| CN | 1995543 A | 7/2007 |
| DE | 3938147 A1 | 6/1991 |
| DE | 102010009510 A1 | 9/2010 |
| EP | 0512264 A2 | 11/1992 |
| EP | 0835962 A1 | 4/1998 |
| EP | 1731677 A1 | 12/2006 |
| JP | 11-229311 A | 8/1999 |
| WO | 99/22076 A1 | 5/1999 |
| WO | 00/43223 A1 | 7/2000 |
| WO | 03/004778 A1 | 1/2003 |
| WO | 2006/039928 A1 | 4/2006 |

* cited by examiner

AUTOMATED DISPENSING OF TRAVEL PATH APPLICANTS

CROSS REFERENCE TO RELATED APPLICATIONS

This application is related to and claims the benefit of U.S. patent application Ser. No. 16/120,510 filed Oct. 31, 2018, entitled AUTOMATED DISPENSING OF TRAVEL PATH APPLICANTS; and U.S. patent application Ser. No. 13/285,767 filed Oct. 31, 2011, entitled AUTOMATED DISPENSING OF TRAVEL PATH APPLICANTS, each of which is hereby incorporated in its entirety by reference herein.

BACKGROUND

Under certain conditions, maintenance vehicles are used to dispense sand, cinders, slag, bottom ash, liquid chemicals (e.g., magnesium chloride, calcium chloride), salt, rock salt, salt brine, and/or to improve travel conditions on roads, avenues, highways, streets, toll roads, ways, interstates, bridges, and/or freeways to improve travel conditions. A need exists to simplify the manner in which such applicants are dispensed.

BRIEF SUMMARY

In general, embodiments of the present invention provide systems, methods, apparatus, and computer program products for dispensing a travel path applicant.

In accordance with one aspect, a method for dispensing a travel path applicant is provided. In one embodiment, the method comprises (1) collecting telematics data associated with a vehicle as the vehicle traverses a travel path in a geographic area; (2) determining, based at least in part on the collected telematics data, whether the travel path traversed by the vehicle in the geographic area satisfies one or more thresholds; and (3) after determining that the travel path traversed by the vehicle in the geographic area satisfies one or more thresholds, automatically adjusting the dispensing of a travel path applicant.

In accordance with yet another aspect, a computer program product for dispensing a travel path applicant is provided. The computer program product may comprise at least one computer-readable storage medium having computer-readable program code portions stored therein, the computer-readable program code portions comprising executable portions configured to (1) collect telematics data associated with a vehicle as the vehicle traverses a travel path in a geographic area; (2) determine, based at least in part on the collected telematics data, whether the travel path traversed by the vehicle in the geographic area satisfies one or more thresholds; and (3) after determining that the travel path traversed by the vehicle in the geographic area satisfies one or more thresholds, automatically adjust the dispensing of a travel path applicant.

In accordance with still another aspect, an apparatus comprising at least one processor and at least one memory including computer program code is provided. In one embodiment, the at least one memory and the computer program code may be configured to, with the processor, cause the apparatus to at least (1) collect telematics data associated with a vehicle as the vehicle traverses a travel path in a geographic area; (2) determine, based at least in part on the collected telematics data, whether the travel path traversed by the vehicle in the geographic area satisfies one or more thresholds; and (3) after determining that the travel path traversed by the vehicle in the geographic area satisfies one or more thresholds, automatically adjust the dispensing of a travel path applicant.

In accordance with one aspect, a method for dispensing a travel path applicant is provided. In one embodiment, the method comprises (1) monitoring the location of a vehicle to determine whether the vehicle has entered a geofenced area; and (2) after determining that the vehicle has entered the geofenced area, automatically adjusting the dispensing of a travel path applicant.

In accordance with another aspect, a computer program product for dispensing a travel path applicant is provided. The computer program product may comprise at least one computer-readable storage medium having computer-readable program code portions stored therein, the computer-readable program code portions comprising executable portions configured to (1) monitor the location of a vehicle to determine whether the vehicle has entered a geofenced area; and (2) after determining that the vehicle has entered the geofenced area, automatically adjust the dispensing of a travel path applicant.

In accordance with yet another aspect, an apparatus comprising at least one processor and at least one memory including computer program code is provided. In one embodiment, the at least one memory and the computer program code may be configured to, with the processor, cause the apparatus to at least (1) monitor the location of a vehicle to determine whether the vehicle has entered a geofenced area; and (2) after determining that the vehicle has entered the geofenced area, automatically adjust the dispensing of a travel path applicant.

BRIEF DESCRIPTION OF THE SEVERAL VIEWS OF THE DRAWING(S)

Reference will be made to the accompanying drawings, which are not necessarily drawn to scale, and wherein:

FIG. 1 is a diagram of a system that can be used to practice various embodiments of the present invention.

FIG. 2 includes a diagram of a data collection device that may be used in association with certain embodiments of the present invention.

DETAILED DESCRIPTION

Figure 1:
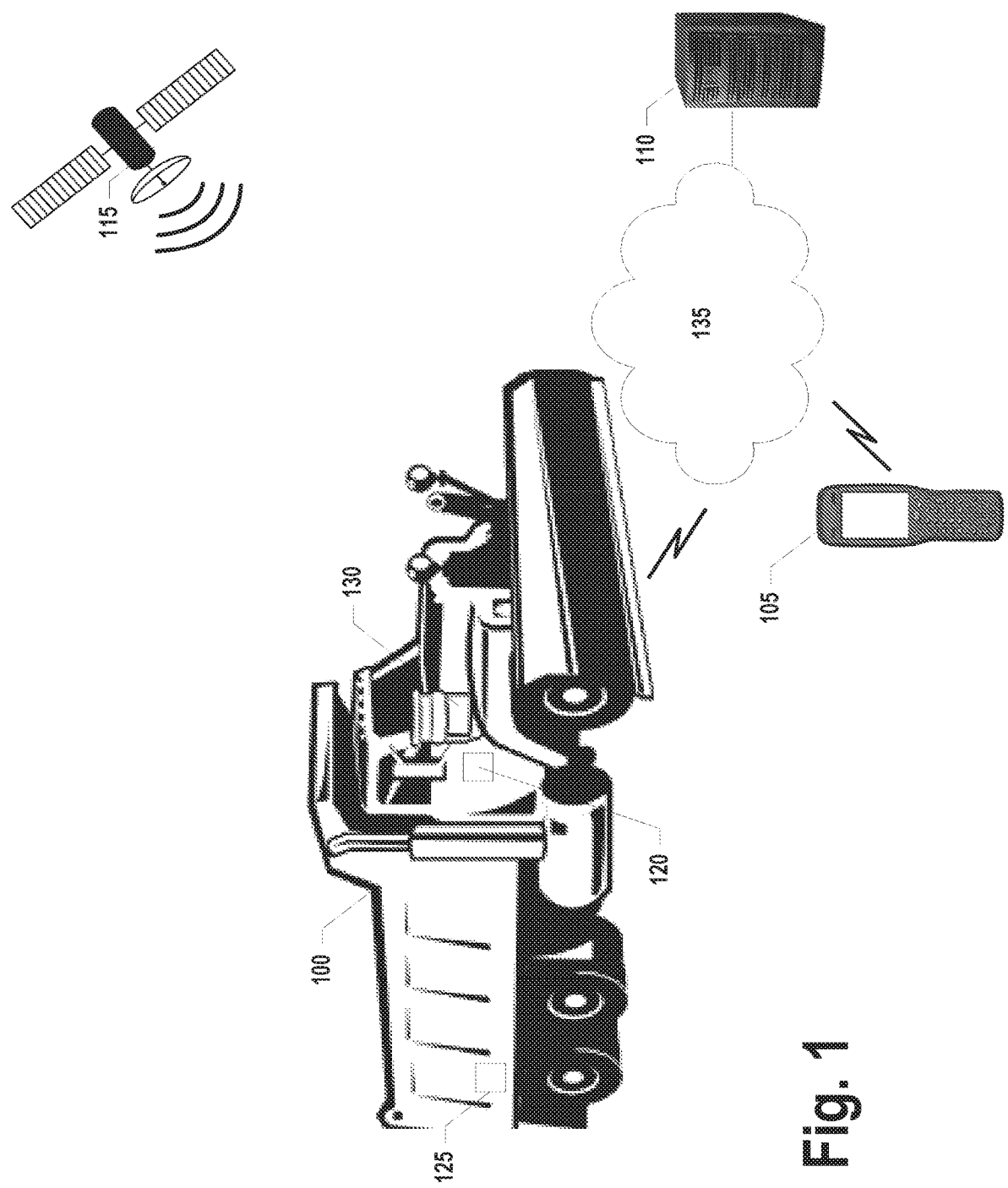

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system that can be used in conjunction with various embodiments of the present invention. As shown in FIG. 1, the system may include one or more maintenance vehicles 100, one or more portable devices 105, one or more servers 110, one or more Global Positioning System (GPS) satellites 115, one or more location sensors 120, one or more telematics sensors 125, one or more data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, a maintenance vehicle 100 may be equipped to provide weather-related maintenance services, such as plowing snow or ice and/or dispensing travel path applicants to melt (and/or prevent or limit the accumulation of) snow or ice. To do so, maintenance vehicles 100 may include one or more plows, spreaders, and/or chutes. A spreader and/or chute may be able dispense travel path applicants in various quantities (e.g., 50-900 pounds of travel path applicant per travel path mile) and in various patterns (e.g., 5 feet to 90 feet). Plows, spreaders, and/or chutes may be controlled automatically (e.g., via communication with portable devices 105, servers 110, and/or data collection devices 130) and/or manually by a driver. For example, the driver may control the spreader and/or chute using a joy-stick controller, pistol-grip controller, touchpad controller, and/or slik-stik controller. A spreader and/or chute controller may also be in electronic communication with various other computing entities (for automatic control), including portable devices 105, servers 110, data collection devices 130, and/or the like.

Figure 2:
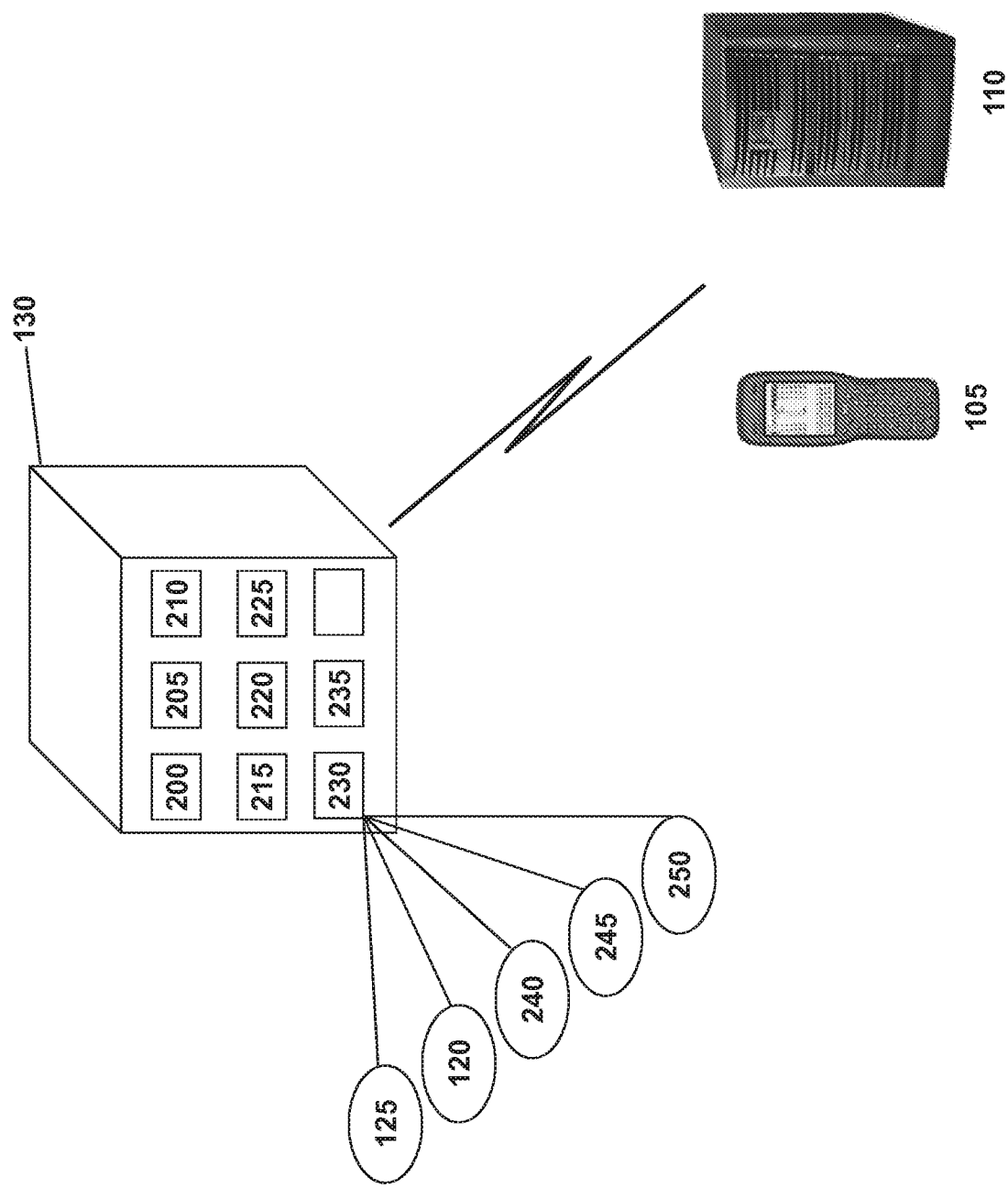

Reference is now made to FIG. 2, which provides a block diagram of an exemplary data collection device 130 of a maintenance vehicle 100. In one embodiment, the data collection device 130 may include, be associated with, or be in communication with one or more power sources 220, one or more real-time clocks 215, one or more processors 200, one or more memory modules 210 (e.g., removable and/or non-removable memory, volatile and/or non-volatile memory, and transitory and/or non-transitory memory), one or more databases (not shown), one or more programmable logic controllers (PLC) 225, a J-Bus protocol architecture, and one or more electronic control modules (ECM) 245. For example, the ECM 245, which may be a scalable and subservient device to the data collection device 130, may have data processing capability to decode and store analog and digital inputs from vehicle systems and sensors. The ECM 245 may further have data processing capability to collect and provide telematics data to the J-Bus (which may allow transmission to the data collection device 130), and output standard vehicle diagnostic codes when received from a vehicle's]-Bus-compatible on-board controllers 240 and/or sensors.

In one embodiment, the data collection device 130 may include, be associated with, or be in communication with one or more radio frequency identification (RFID) tags 250. In one embodiment, the one or more RFID tags 250 may include active RFID tags, each of which may comprise at least one of the following: (1) an internal clock; (2) a memory; (3) a microprocessor; and (4) at least one input interface for connecting with sensors located in the vehicle 100 and/or the data collection device 130. In another embodiment, the RFID tags 250 may be passive RFID tags.

In one embodiment, the data collection device 130 may include, be associated with, or be in communication with one or more location-determining devices and/or one or more location sensors 120 (e.g., Global Navigation Satellite System (GNSS) sensors). The one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's driver and with various communication points (e.g., cellular towers or Wi-Fi access points) positioned at various locations throughout a geographic area to monitor the location of the vehicle 100 and/or its driver. The one or more location sensors 120 may be used to receive latitude, longitude, altitude, geocode, course, position, time, and/or speed data (e.g., referred to as telematics data). The one or more location sensors 120 may also communicate with the server 110, the data collection device 130, and/or a similar network entity.

In one embodiment, the data collection device 130 may include, be associated with, or be in communication with one or more vehicle sensors 125. In one embodiment, the vehicle sensors 125 may include vehicle sensors, such as engine, gyroscope, fuel, odometer, hubometer, tire, location, weight, emissions, door, and speed sensors. Thus, the one or more vehicle sensors 125 may collect speed data, traction data (e.g., tire slippage), acceleration data, engine torque data, gyroscope data, emissions data, revolutions per minute (RPM) data, tire pressure data, oil pressure data, seat belt usage data, distance data, fuel data, idle data, and/or the like (e.g., referred to as telematics data). The vehicle sensors 125 may also include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data and/or meteorological data (e.g., referred to as telematics data).

In one embodiment, the data collection device 130 may include, be associated with, or be in communication with one or more communication ports 230 for receiving data from various sensors (e.g., via a CAN-bus), one or more communication ports 205 for transmitting data, and one or more data radios 235 for communication with a variety of communication networks. Embodiments of the communication port 230 may include an Infrared Data Association (IrDA) communication port, a data radio, and/or a serial port. The communication port 230 may receive instructions for the data collection device 130. These instructions may be specific to the vehicle 100 in which the data collection device 130 is installed, specific to the geographical area in which the vehicle 100 will be operated, and/or specific to the function the vehicle 100 serves within the fleet. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via these communication standards and protocols, the data collection device 130 can communicate with various other entities, such as the portable device 105 and/or the server 110. As will be recognized, the data collection device 130 may transmit the telematics data to the portable device 105 and/or the server 110 via such communication methods.

b. Exemplary Server

Figure 3:
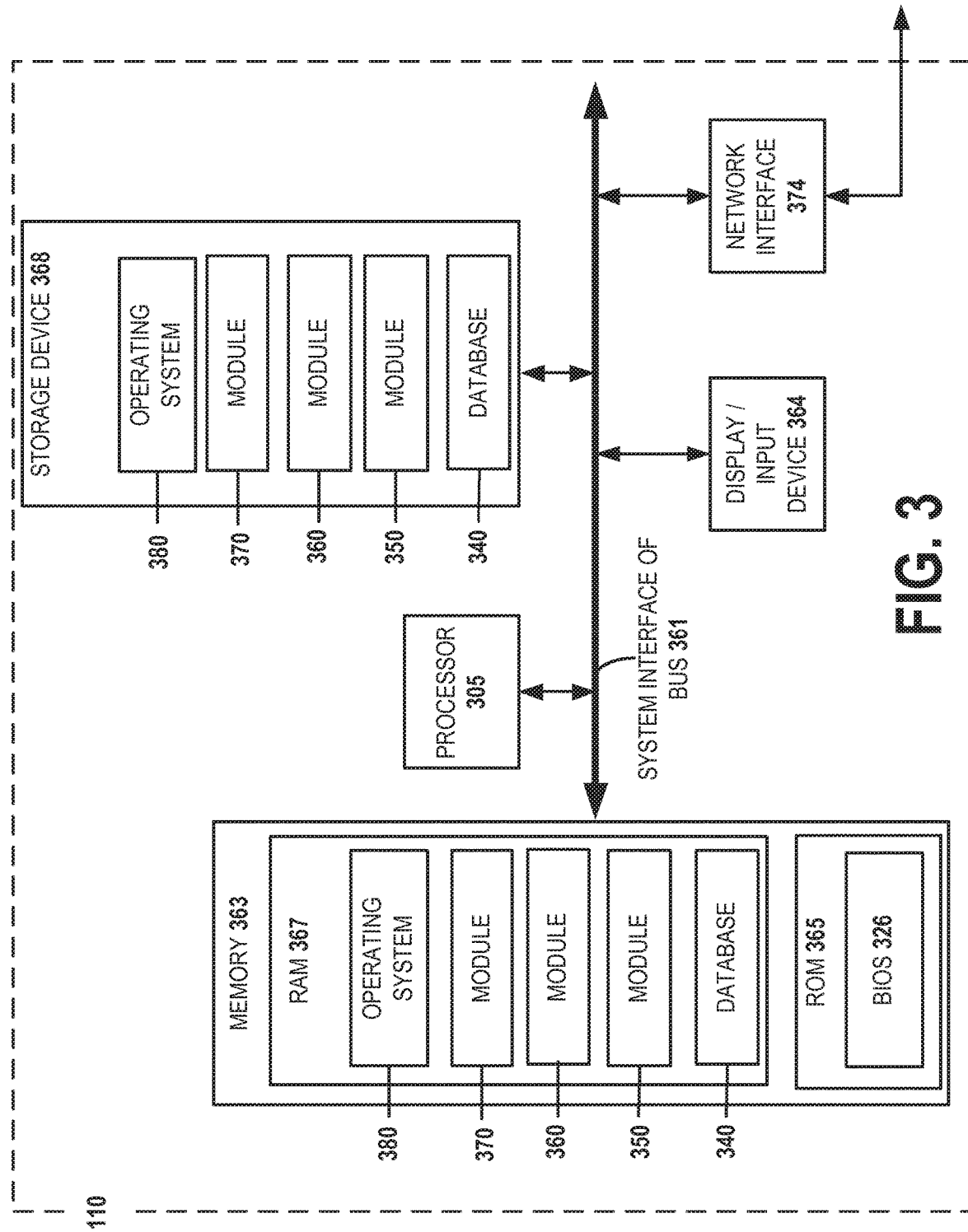
FIG. 3 is a schematic of a server in accordance with certain embodiments of the present invention.

FIG. 3 provides a schematic of a server 110 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the server 110 may include a processor 305 that communicates with other elements within the server 110 via a system interface or bus 361. The processor 305 may be embodied in a number of different ways. For example, the processor 305 may be embodied as one or more processing elements, one or more microprocessors with accompanying digital signal processors, one or more processors without an accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention when configured accordingly. A display device/input device 364 for receiving and displaying data may also be included in or associated with the server 110. The display device/input device 364 may be, for example, a keyboard or pointing device that is used in combination with a monitor. The server 110 may further include transitory and non-transitory memory 363, which may include both random access memory (RAM) 367 and read only memory (ROM) 365. The server's ROM 365 may be used to store a basic input/output system (BIOS) 326 containing the basic routines that help to transfer information to the different elements within the server 110.

In addition, in one embodiment, the server 110 may include at least one storage device 368, such as a hard disk drive, a CD drive, a DVD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 368 may be connected to the system bus 361 by an appropriate interface.

Furthermore, a number of executable instructions, applications, scripts, program modules, and/or the like may be stored by the various storage devices 268 and/or within RAM 267. Such executable instructions, applications, scripts, program modules, and/or the like may include an operating system 280 and various other modules 350, 360, 370. As discussed in greater detail below, these modules may control certain aspects of the operation of the server 110 with the assistance of the processor 305 and operating system 380—although their functionality need not be modularized.

In addition to the program modules, the server 110 may store and/or be in communication with one or more databases, such as database 340.

Also located within and/or associated with the server 110, in one embodiment, is a network interface 374 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the server 110 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the server's 110 components may be located remotely from other server 110 components. Furthermore, one or more of the components may be combined and additional components performing functions described herein may be included in the server 110.

c. Exemplary Portable Device

Figure 4:
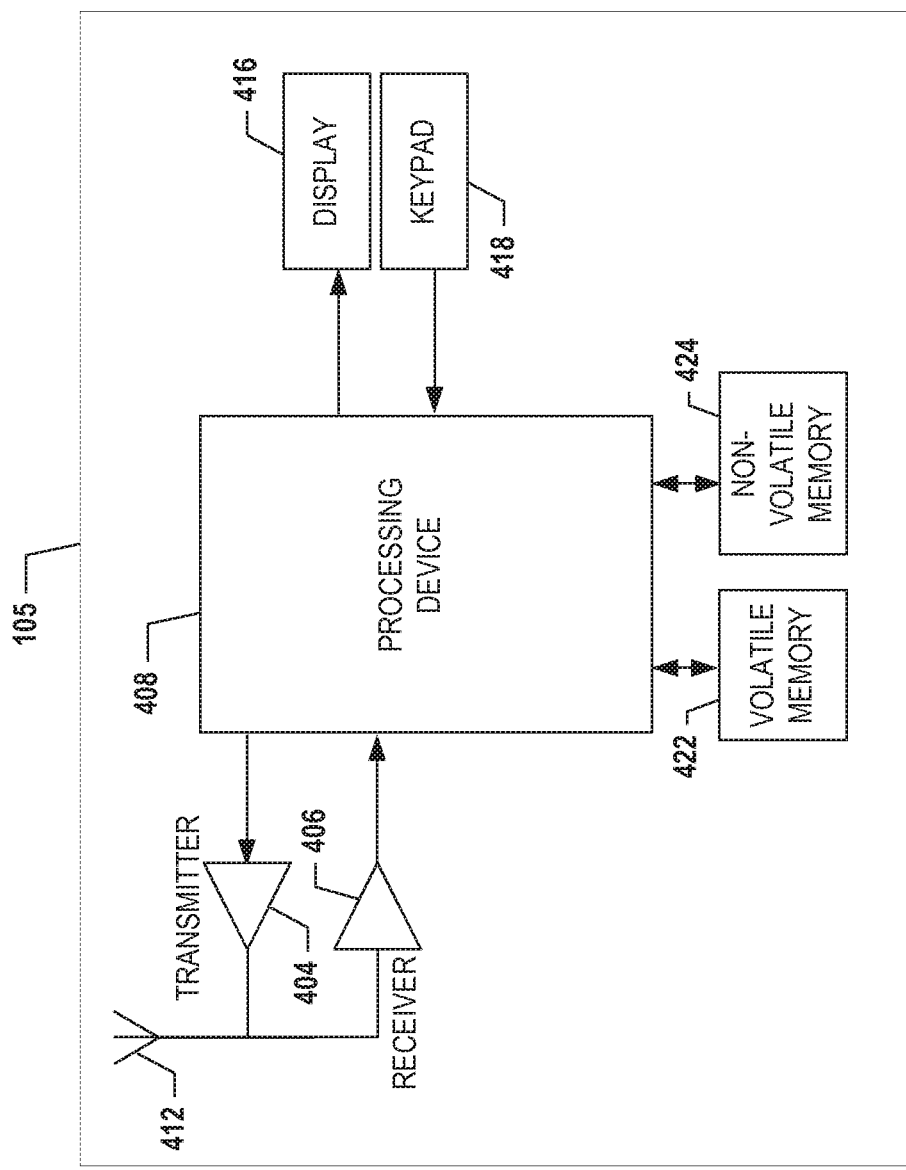
FIG. 4 is a schematic of a portable device in accordance with certain embodiments of the present invention.

With respect to the portable device 105, FIG. 4 provides an illustrative schematic representative of a portable device 105 that can be used in conjunction with the embodiments of the present invention (e.g., a portable device 105 carried by a driver of a maintenance vehicle 100). As shown in FIG. 4, the portable device 105 can include an antenna 412, a transmitter 404, a receiver 406, and a processing device 408, e.g., a processor, controller, and/or the like, that provides signals to and receives signals from the transmitter 404 and receiver 406, respectively.

The signals provided to and received from the transmitter 404 and the receiver 406, respectively, may include signaling information in accordance with an air interface standard of applicable wireless (or wired) systems. In this regard, the portable device 105 may be capable of operating with one or more air interface standards, communication protocols, modulation types, and access types. More particularly, the portable device 105 may operate in accordance with any of a number of second-generation (2G) communication protocols, third-generation (3G) communication protocols, and/or the like. Further, for example, the portable device 105 may operate in accordance with any of a number of different wireless networking techniques, such as GPRS, UMTS, CDMA2000, WCDMA, TD-SCDMA, LTE, E-UTRAN, Wi-Fi, WiMAX, UWB, and/or any other wireless protocol. Via these communication standards and protocols, the portable device 105 can communicate with the server 110, data collection devices 130, and/or various other entities.

The portable device 105 may also comprise a user interface (that can include a display 416 coupled to a processing device 408) and/or a user input interface (coupled to the processing device 408). The user input interface can comprise any of a number of devices allowing the portable device 105 to receive data, such as a keypad 418, a touch display (not shown), barcode reader (not shown), RFID tag reader (not shown), and/or other input device. In embodiments including a keypad 418, the keypad 418 can include the conventional numeric (0-9) and related keys (#, *), and other keys used for operating the portable device 105 and may include a full set of alphabetic keys or set of keys that may be activated to provide a full set of alphanumeric keys.

In addition to providing input, the user input interface can be used, for example, to activate and/or deactivate certain functions, such as screen savers and/or sleep modes. Although not shown, the portable device 105 may also include a battery, such as a vibrating battery pack, for powering the various circuits that are required to operate the portable device 105, as well as optionally providing mechanical vibration as a detectable output.

The portable device 105 can also include volatile memory 422 and/or non-volatile memory 424, which can be embedded or may be removable. For example, the non-volatile memory may be embedded or removable MMCs, SD memory cards, Memory Sticks, EEPROM, flash memory, hard disk, and/or the like. The memory can store any of a number of pieces or amount of information and data used by the portable device 105 to implement the functions of the portable device 105. The memory can also store content, such as computer program code for an application and/or other computer programs.

The portable device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites. In addition, data regarding, for example, heading and estimated time of arrival (ETA) can also be captured, which enhances the determination of the position of the GPS module.

III. EXEMPLARY SYSTEM OPERATION

Figure 5:
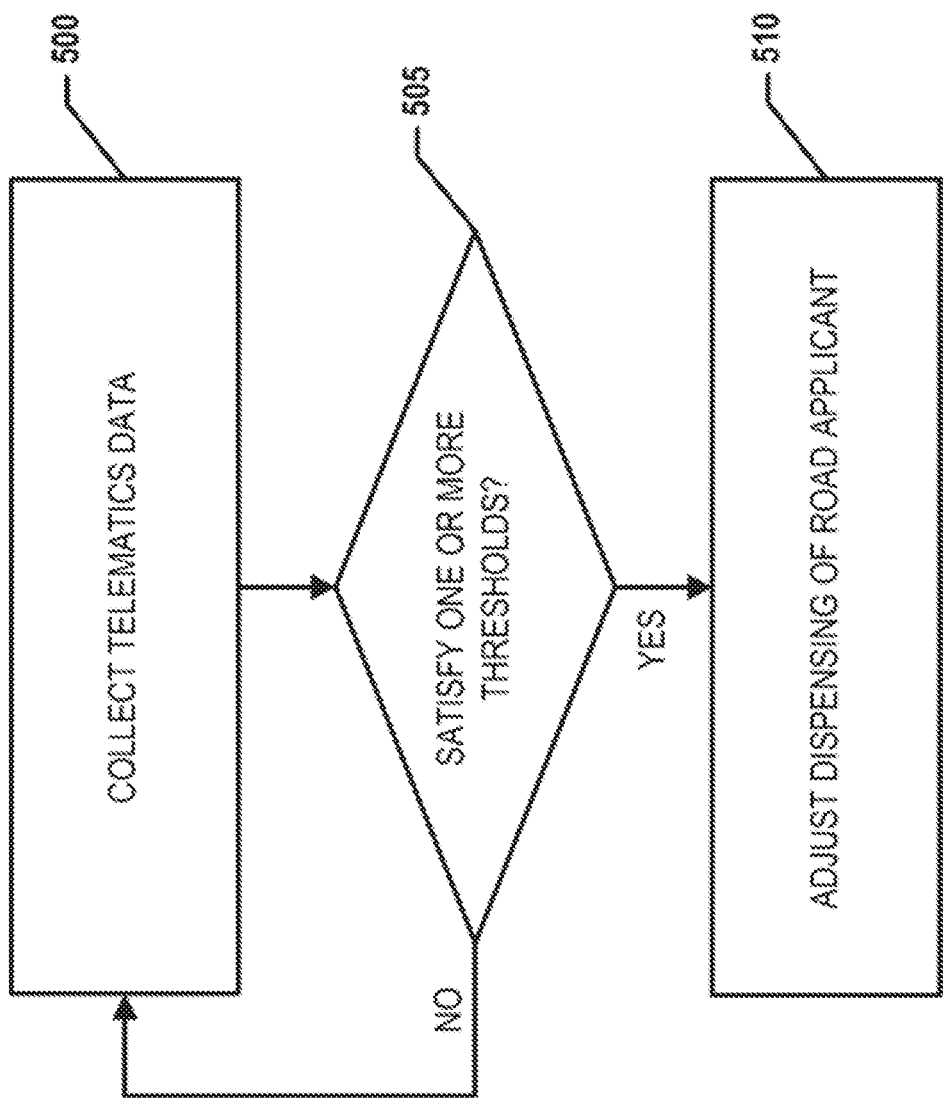
FIGS. 5-6 are flowcharts illustrating operations and processes that can be used in accordance with various embodiments of the present invention.
Figure 6:
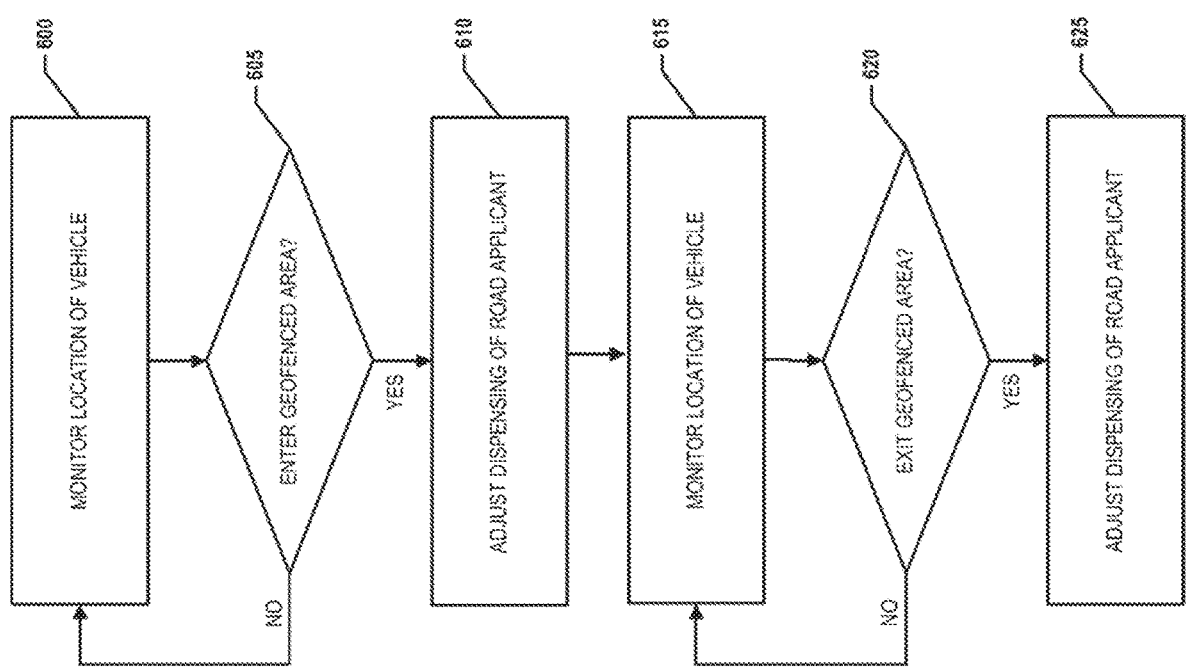

Reference will now be made to FIGS. 5-6. FIGS. 5-6 illustrate operations and processes that can be performed for providing weather-related maintenance services, such as dispensing travel path applicants, for travel paths in geographic areas.

A. Geographic Areas

In one embodiment, maintenance vehicles 100 may be associated with, assigned to, or traverse one or more geographic areas. In one embodiment, the geographic areas may correspond to countries, regions, states, counties, cities, towns, and/or the like. For example, geographic areas may be defined around the United States, the state of Georgia, Gwinnett County in the state of Georgia, and/or the like. In one embodiment, the geographic areas may correspond to travel paths (e.g., roads, avenues, highways, streets, toll roads, ways, interstates, bridges, freeways, etc.). For example, a geographic area may be defined around a public road (e.g., substantially around I-285) or a portion of a public road (e.g., exit and/or entrance ramps on I-75 in Georgia or throughout the U.S. and portions of I-75 with a grade above 20%). As will be recognized, geographic areas may also correspond to private land areas, vehicle staging areas, parking lots (e.g., at malls or other establishments), driveways, and/or the like.

According to various embodiments of the present invention, a geographic area may overlap or reside wholly within another geographic area. Geographic areas may, for example, be as large as an entire country, region, state, county, city, or town (or larger). According to various embodiments, the geographic areas need not be continuous. In other words, a geographic area may specifically exclude an area that would otherwise fall within the geographic area (e.g., such that the geographic area forms a donut or other shape around the excluded area).

The geographic areas may be defined based on any number and/or combination of factors including, but not limited to, those described above. The foregoing examples are therefore provided for exemplary purposes only and should not be taken in any way as limiting embodiments of the present invention to the examples provided.

B. Weather-Related Maintenance Services for Travel Paths in Geographic Areas

As indicated, various weather-related maintenance services can be provided for travel paths. The weather related maintenance services may include maintenance vehicles 100 dispensing travel path applicants on, for example, snowy and/or icy travel paths. Such travel path applicants may be used to melt ice or snow, prevent the accumulation of ice or snow, and/or improve traction for vehicles. To do so, travel path applicants may be in a variety of forms, such as sand, cinders, slag, bottom ash, liquid chemicals (e.g., magnesium chloride, calcium chloride), salt, rock salt, and/or salt brine. As will be recognized, a variety of travel path applicants can be used to adapt of various needs and circumstances.

In one embodiment, travel path applicants can be dispensed at a variety of dispense rates. For example, illustrative dispense rates may be between 50 and 900 pounds of travel path applicant per travel path mile. Similarly, a variety of different dispense patterns can be used to dispense travel path applicants on a travel path. For instance, travel path applicants may be dispensed in various patterns ranging from, for example, 5 feet to 90 feet. In various embodiments, by adjusting the dispense rates and the dispense patterns, waste of dispensed travel applicants can be minimized.

As will be recognized, the dispense rate and/or dispense pattern of travel path applicants dispensed may vary based on the characteristics of the travel path (or parts of the travel path). For example, parts of travel paths having one or more of the following characteristics may benefit from increased dispensing of travel path applicants: bridges; school zones; intersections; high-traffic areas; curves or turns; high-accident areas; travel path grades above a certain percentage, degree, or grade; increased travel speeds; certain types of pavement (e.g., pervious concrete, asphalt); and/or the like. For instance, travel paths with grades above 20% may have a greater amount of travel path applicants dispensed on the parts of the travel path that have grades of 20% or above. As will be recognized, various other characteristics can be used to adapt to various needs and circumstances.

In one embodiment, a variety of different approaches can be used to dispense travel path applicants.

C. Telematics-Based Dispensing

In one embodiment, telematics data may be used to dispense travel path applicants on a travel path. For example, a computing entity (e.g., the data collection device 130, portable device 105, and/or server 110) may be configured to collect and analyze telematics data. As indicated, telematics data may include latitude, longitude, altitude, geocode, course, position, time, speed, traction (e.g., tire slippage), acceleration, engine torque, gyroscope, emissions, RPM, tire pressure, oil pressure, seat belt usage, distance, fuel, idle, air quality, temperature, meteorological data, and/or the like. Using such telematics data, the maintenance vehicle 100 can be used to dispense travel path applicants under certain conditions.

i. Thresholds

In one embodiment, one or more thresholds can be defined to control the dispensing of travel path applicants. Further, each threshold may be associated with a dispense rate and/or a dispense pattern. For example, three different speed thresholds may be defined: (1) less than or equal to 20 miles per hour; (2) above 20 miles per hours and less than or equal to 40 miles per hour; and (3) above 40 miles per hour. Each of these thresholds may be associated with a dispense rate and/or a dispense pattern. For example, the first threshold ((1) less than or equal to 20 miles per hour) may be associated with a dispense rate of 200 pounds of travel path applicant per travel path mile. Similarly, the second threshold ((2) above 20 miles per hours and less than or equal to 40 miles per hour) may be associated with a dispense rate of 275 pounds of travel path applicant per travel path mile. And the third threshold ((3) above 40 miles per hour) may be associated with a dispense rate of 350 pounds of travel path applicant per travel path mile. Thus, when the maintenance vehicle 100 travels at the various speeds, the travel path applicant can be dispensed at the appropriate dispense rate (and/or dispense pattern).

As will be recognized, a variety of other thresholds can be defined and associated with dispense rates and/or dispense patterns. Such thresholds may include engine torque thresholds: (1) less than or equal to 300 pound-feet of torque and (2) above 300 pound-feet of torque. Additional thresholds may include one or more traction thresholds (e.g., tire slippage), and/or one or more acceleration thresholds. Further, one gyroscope thresholds can used: (1) an inclination angle of a maintenance vehicle 100 less than or equal 20% with respect to the horizontal line and (2) an inclination angle of a maintenance vehicle 100 above 20% with respect to the horizontal line. This particular threshold can be used to dispense travel path applicants based on the grade of the travel path. In one embodiment, each of these thresholds may be associated with dispense rates and/or dispense patterns.

In one embodiment, multiple thresholds can be defined to control the dispensing of a travel path applicant, such as shown below in Table 1.

TABLE 1

| | | TRAVEL PATH GRADE | |
|---|---|---|---|
| | | 20% grade< | >20% grade |
| SPEED | 20 mph< | 200 | 275 |
| | >20 mph and <40 mph | 275 | 350 |
| | >40 mph | 350 | 425 |

As will be recognized, various thresholds can be defined to adapt to various needs and circumstances. To determine whether such thresholds have been satisfied, telematics data can collected and analyzed regularly, periodically, continuously, and/or in response to certain triggers.

ii. Regular, Periodic, and/or Continuous Collection

In one embodiment, as indicated in Block 500 of FIG. 5, a computing entity (e.g., the data collection device 130, portable device 105, and/or server 110) may be configured to regularly, periodically, and/or continuously collect and analyze telematics data. For example, a computing entity (e.g., the data collection device 130, portable device 105, and/or server 110) can be configured to regularly, periodically, and/or continuously collect and analyze telematics data as a maintenance vehicle 100 travels in (e.g., traverses) a geographic area. For instance, telematics data can be collected and analyzed at certain time intervals (such as every 2, 5, 15 seconds) and/or certain distance intervals (such as every ⅒, ⅕, ½ mile).

iii. Triggered Collection

As indicated in Block 500 of FIG. 5, telematics data can be collected and analyzed as maintenance vehicles 100 are operated in geographic areas, such as while maintenance vehicles 100 are traversing travel paths and/or dispensing travel path applicants. To do so, in one embodiment, a computing entity (e.g., a data collection device 130, portable device 105, and/or server 110) can be configured to collect and analyze telematics data in response to (e.g., after) one or more predefined triggers. Continuing with the above example, a computing entity can collect and analyze telematics data once the maintenance vehicle begins dispensing travel path applicants, for example. Thus, various triggers can be defined for telematics data collection and analysis. Such trigger events may include, but are not limited to: (1) traveling above or below a certain speed; (2) traveling within a geofenced area; and/or (3) the like. Thus, in response to (e.g., after) one or more predefined trigger events, a computing entity (e.g., the data collection device 130, portable device 105, and/or server 110) can collect and analyze telematics data as a maintenance vehicle travels in (e.g., traverses) a geographic area iv. Dispensing After (e.g., in response to) telematics data is collected regularly, periodically, continuously, and/or in response to certain triggers, a computing entity can analyze the telematics data to determine whether one or more of the thresholds have been satisfied.

In one embodiment, in response to (e.g., after) a determination that one or more thresholds have been satisfied (Block 505 of FIG. 5), a computing entity (e.g., the data collection device 130, portable device 105, or server 110) can automatically adjust the dispensing of the travel path applicant (Block 510 of FIG. 5). For example, after determining that the travel path grade is >20% and that the maintenance vehicle is travel 35 miles per hours, a computing entity (e.g., the data collection device 130, portable device 105, or server 110) can automatically adjust the dispensing of the travel path applicant to 350 pounds of travel path applicant per travel path mile. In another embodiment, satisfying the one or more thresholds may be used to initiate (or stop) the dispensing of travel path applicants. Additionally or alternatively, the computing entity can also automatically adjust the dispense pattern of the travel path applicant. In still another embodiment, instead of (and/or in addition to) automatically adjusting the dispensing, the computing entity can indicate (e.g., visibly or audibly) to the driver of the maintenance vehicle 100 that he or she should adjust the dispensing of the travel path applicant to the specified dispense rate and/or pattern. As will be recognized a variety of other approaches and techniques can be used to adapt to various needs and circumstances.

D. Geofence-Based Dispensing

In one embodiment, one or more geofences may be used to dispense travel path applicants on a travel path.

i. Defined Geofences

Map vendors, such as Tele Atlas® and NAVTEQ®, provide digitized maps to a variety of clients for different purposes. For example, such companies may provide digitized maps to: (a) Internet websites for providing driving directions to consumers; (b) cellular companies to include in phones and personal digital assistants; (c) government agencies (e.g., the United States Department of Agriculture and Environmental Protection Agency) for use in their respective government functions; and (d) transportation and logistics companies. In one embodiment, entities that dispense travel path applicants, can license, purchase, and/or use digitized maps from vendors like Tele Atlas® and NAVTEQ®.

In one embodiment, using such digitized maps, a computing entity (e.g., the data collection device 130, portable device 105, and/or server 110) may be used to define one or more geofences. The geofences may be defined to surround countries, regions, states, counties, cities, towns, neighborhoods, off-road areas (e.g., areas without paved roads), private land areas, parking lots, and/or the like. Further, one or more geofences may be defined to surround travel paths (e.g., roads, avenues, highways, streets, toll roads, ways, interstates, freeways) or parts of travel paths (e.g., such as bridges, school zones, intersections, exit and entrance ramps, grades above a certain percentage, high-traffic areas, high-accident areas, increased travel speed areas, travel paths with certain types of pavement, and/or the like). The geofences may be defined, for example, by the latitude and longitude coordinates associated with various points along the perimeter of the geographic area. Alternatively, geofences may be defined based on latitude and longitude coordinates of the center, as well as the radius, of the geographic area. Geofences may be as large as an entire country, region, state, county, city, or town (or larger) or as small as an intersection (or smaller). The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention.

In one embodiment, once at least one geofence has been defined, the coordinates (or similar methods for defining the geofenced areas) may be stored in a database associated with, for example, the data collection device 130, portable device 105, and/or server 110. Thus, as the maintenance vehicle 100 enters and exits the one or more defined geofences, a computing entity (the data collection device 130, portable device 105, and/or server 110) can monitor the location of the maintenance vehicle 100 and trigger/initiate certain events based on the maintenance vehicle's 100 location. For instance, entering and/or exiting a geofenced area may be used to adjust the dispense rate and/or dispense pattern of travel path applicants as the maintenance vehicle traverses a travel path within a geographic area. In one embodiment, to do so, each geofenced area may be associated with one or more dispense rates and/or one or more dispense patterns. For example, a geofence defined around a bridge, intersection, or a part of a travel path with a grade above 20% may be associated with a dispense rate of 450 pounds of travel path applicant per travel path mile. Whereas a geofence defined around a straight part of a lightly-traveled travel path may be associated with a dispense rate of 150 pounds of travel path applicant per travel path mile. Similarly, dispense patterns can be associated with each defined geofence.

ii. Dispensing

In one embodiment, after the one or more geofenced areas (e.g., geofences) have been defined, the location of the maintenance vehicle 100 can be monitored (Block 600 of FIG. 6) on a regular, periodic, or continuous basis. Generally, the location of the maintenance vehicle 100 can be monitored by any of a variety of computing entities (e.g., the data collection device 130, portable device 105, and/or server 110), including the data collection device 130, the portable device 105, and/or the server 110. For example, as noted above, the maintenance vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the maintenance vehicle's 100 location, a computing entity (data collection device 130, portable device 105, or server 110) can determine, for example, when the vehicle 100 enters a defined geofence (Block 605 of FIG. 6).

In one embodiment, as indicated in Block 610 of FIG. 6, in response to (e.g., after) a determination that a maintenance vehicle 100 has entered a defined geofenced area, a computing entity (e.g., the data collection device 130, portable device 105, or server 110) can automatically adjust the dispensing of the travel path applicant. For example, upon entering a geofenced area, such as a geofence defined around an intersection associated with a dispense rate of 450 pounds of travel path applicant per travel path mile, a computing entity can automatically adjust the dispense rate of the travel path applicant to 450 pounds per travel path mile. In another embodiment, entering the geofence may be used to initiate (or stop) the dispensing of a travel path applicant. Additionally or alternatively, the computing entity can also automatically adjust the dispense pattern of the travel path applicant. In still another embodiment, instead of (and/or in addition to) automatically adjusting the dispensing, the computing entity can indicate (e.g., visibly or audibly) to the driver of the maintenance vehicle 100 that he or she should adjust the dispensing of the travel path applicant to the specified dispense rate and/or pattern.

In one embodiment, after the maintenance vehicle 100 has entered the geofenced area, the location of the vehicle 100 can continue to be monitored (Block 615 of FIG. 6) by any of a variety of computing entities on a regular, periodic, or continuous basis. By using the maintenance vehicle's 100 location, a computing entity can determine, for example, when the maintenance vehicle 100 exits the defined geofenced area (Block 620 of FIG. 6). As described, this may include using location-determining devices, location sensors 120 (e.g., GNSS sensors), or other telemetry location services (e.g., cellular assisted GPS or real time location system or server technology using received signal strength indicators from a Wi-Fi network).

In one embodiment, as indicated in Block 625 of FIG. 6, in response to (e.g., after) a determination that a maintenance vehicle 100 has exited the defined geofenced area, a computing entity can automatically adjust the dispensing of the travel path applicant. For example, upon entering a geofenced area, such as a geofence defined around a straight part of a lightly-traveled travel path associated with a dispense rate of 50 pounds of travel path applicant per travel path mile, the computing entity can automatically adjust the dispense rate of the travel path applicant to 50 pounds per travel path mile. In another embodiment, exiting the geofence may be used to stop (or initiate) the dispensing of travel path applicants altogether. Additionally or alternatively, the computing entity can also automatically adjust the dispense pattern of the travel path applicant. In still another embodiment, instead of (and/or in addition to) automatically adjusting the dispensing, the computing entity can indicate (e.g., visibly or audibly) to the driver of the maintenance vehicle 100 that he or she should adjust the dispensing of the travel path applicant to the specified dispense rate and/or pattern. As will be recognized a variety of approaches and techniques can be used to adapt to various needs and circumstances.

IV. CONCLUSION

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for dispensing a travel path applicant, the method comprising:
   electronically obtaining telematics data comprising a gyroscope measurement or traction data, the telematics data corresponding to a vehicle as the vehicle traverses a travel path in a geographic area;
   electronically determining a dispense rate based at least in part on the obtained telematics data comprising the gyroscope measurement or the traction data, a first characteristic of travel path applicant, and an external characteristic; and
   in response to electronically determining the dispense rate, automatically initiate a dispensing of travel path applicant at the dispense rate.

2. The method of claim 1, wherein the first characteristic of travel path applicant is a composition of the travel path applicant, and wherein the dispense rate is additionally based on a second characteristic of travel path applicant, wherein the second characteristic is a form.

3. The method of claim 1, wherein the external characteristic is a temperature, the temperature detected by a sensor external to the vehicle.

4. The method of claim 1, wherein the external characteristic is a type of travel path the vehicle is traversing, the type of travel path detected by at least one sensor external to the vehicle.

5. The method of claim 4, wherein the type of travel path is concrete or asphalt.

6. The method of claim 1, wherein the telematics data corresponding to the vehicle as the vehicle traverses the travel path comprise a speed of the vehicle, an engine torque, an emissions measurement, and a tire pressure.

7. A system for dispensing a travel path applicant, the system comprising:
   a sensor that electronically obtains telematics data corresponding to a vehicle as the vehicle traverses a travel path in a geographic area;
   the vehicle equipped to carry the travel path applicant; and
   at least one processor and at least one memory including computer program code, the at least one memory and the computer program code configured to, with the at least one processor, cause the system to at least:
      electronically determine a dispense rate based at least in part on the obtained telematics data, a first characteristic of travel path applicant, and an external characteristic associated with the travel path other than temperature and precipitation; and
      in response to electronically determining the dispense rate, cause the vehicle to automatically initiate a dispensing of the travel path applicant at the dispense rate.

8. The system of claim 7, wherein electronically determining the dispense rate based on the external characteristic associated with the travel path comprises determining the travel path includes a bridge.

9. The system of claim 8, wherein the dispense rate of the travel path applicant is increased along a portion of the travel path based on the external characteristic associated with the travel path comprising an increased grade degree along the portion of the travel path relative to a second portion of the travel path, and wherein the dispense rate of the travel path applicant is adjusted based on a curve of the travel path and a type of pavement of the travel path.

10. The system of claim 7, wherein electronically determining the dispense rate comprises determining a dispense pattern of feet of the travel path applicant.

11. The system of claim 7, wherein the travel path is concrete or asphalt.

12. The system of claim 7, wherein the travel path applicant is selected from a group consisting of sand, liquid chemicals, and salt.

13. The system of claim 7, further comprising determining a type of travel path detected by at least one sensor external to the vehicle.

14. The system of claim 7, wherein the geographic area corresponds to a digitized map that specifies a geofence, the geofence including at least a portion of the travel path.

15. The system of claim 7, wherein the telematics data includes latitude, longitude, altitude, geocode, course, position, time, speed, traction, acceleration, engine torque, gyroscope, emissions, RPM, tire pressure, oil pressure, seat belt usage, distance, fuel, idle, air quality, temperature, and meteorological data associated with the vehicle.

16. A computer program product comprising at least one computer-readable storage medium having computer-readable program code portions stored therein, the computer-readable program code portions comprising:
   electronically obtaining telematics data corresponding to a vehicle as the vehicle traverses a travel path in a geographic area;
   electronically determining, based at least in part on a gyroscope measurement, traction data, or accelerometer data from the obtained telematics data, the vehicle has entered a first geofenced area within the geographic area; and
   in response to determining that has entered the first geofenced area, automatically initiate a dispensing of travel path applicant.

17. The computer program product of claim 16, wherein the travel path comprises one or more thresholds selected from a group consisting of (a) a grade of the travel path, (b) a curve of the travel path, and (c) a speed of the vehicle.

18. The computer program product of claim 16, wherein the travel path applicant is selected from a group consisting of sand, liquid chemicals, and salt.

19. The computer program product of claim 16, wherein the telematics data includes latitude, longitude, altitude, geocode, course, position, time, speed, engine torque, emissions, RPM, tire pressure, oil pressure, seat belt usage, distance, fuel, idle, air quality, temperature, and meteorological data associated with the vehicle.

20. The computer program product of claim 16, wherein the geographic area corresponds to a digitized map that specifies a geofence, the geofence including at least a portion of the travel path.

* * * * *

UNITED STATES PATENT AND TRADEMARK OFFICE
CERTIFICATE OF CORRECTION

| | | |
|---|---|---|
| PATENT NO. | : 11,339,547 B2 | Page 1 of 1 |
| APPLICATION NO. | : 17/087354 | |
| DATED | : May 24, 2022 | |
| INVENTOR(S) | : Nagesh Kadaba | |

It is certified that error appears in the above-identified patent and that said Letters Patent is hereby corrected as shown below:

In the Specification

In Column 1, Line 8, delete "Oct. 31, 2018" and insert -- Sep. 4, 2018 --.

Signed and Sealed this
Twenty-third Day of August, 2022

Katherine Kelly Vidal
*Director of the United States Patent and Trademark Office*